Dec. 17, 1968 J. C. SALONISH 3,416,739
ATTRITION OF GRANULAR CARBON
Filed Aug. 26, 1966
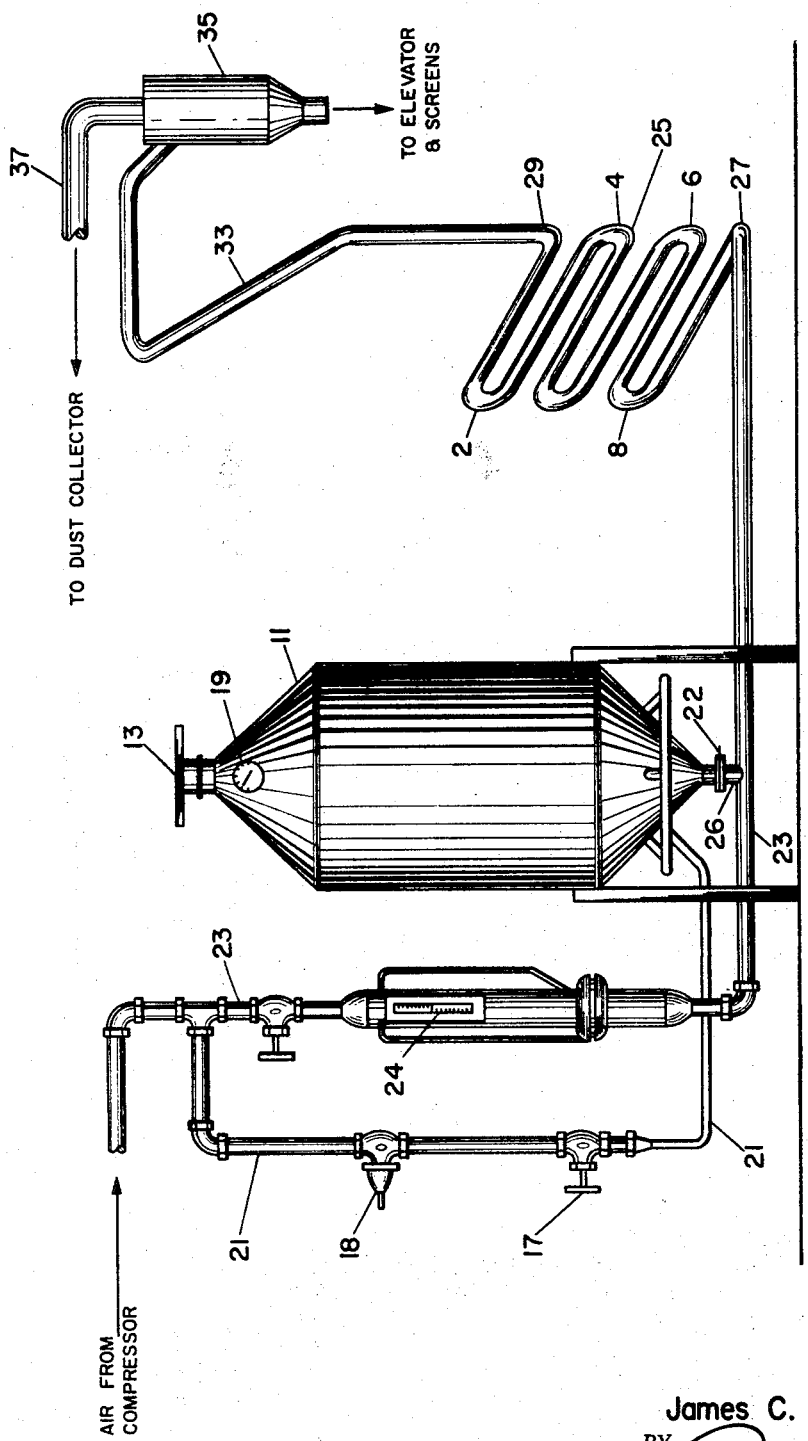
INVENTOR.
James C. Salonish
BY
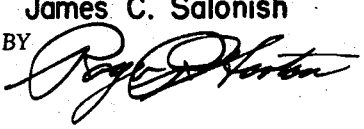

United States Patent Office 3,416,739
Patented Dec. 17, 1968

3,416,739
ATTRITION OF GRANULAR CARBON
James C. Salonish, Marshall, Tex., assignor to Atlas Chemical Industries, Inc., Wilmington, Del., a corporation of Delaware
Filed Aug. 26, 1966, Ser. No. 575,398
4 Claims. (Cl. 241—5)

ABSTRACT OF THE DISCLOSURE

The disclosed invention is directed to a process for attrition of granular carbon particles having very rough surfaces and jagged edges by fluidizing such granular carbon particles through a series of looped pipes. The granular carbon particles so processed are characterized by higher density, and relatively smooth edges and surfaces as compared to the initially charged granular carbon particles.

---

This invention relates to a method for attrition of granular carbon. More particularly, the present method is concerned with attrition of granular carbon before placing it in containers for shipment comprising pneumatically passing granular carbon through a series of looped pipes.

Particles of granular carbon which are the products of known processes may be characterized generally as having very rough surfaces and jagged edges. When such products are utilized in any of the many areas for which they are intended, it is generally found that through the handling and use of such granular carbons physical changes will occur which are exemplified by modifications in the surface structure and density of the granular carbon particles. For example, it is generally known that when activated carbon products of prior art methods are charged into a pressure column for purposes of liquid purification or clarification by the adsorption technique there is generally experienced a drop in pressure in the said column when the activated carbon is first used in such a purification process. This decrease in pressure is attributed to the packing and attrition of the carbon in the column resulting from movement thereof within the said column during the purification cycle. As a result of such attrition of activated carbon in pressurized columns during the process of clarifying solutions, there has been experienced great difficulty in controlling such purification processes and variations in the desired product of the purification process are generally experienced.

Excessive dusting is another problem associated with the use of prior art granular carbons which results in handling difficulties and contamination problems. Dusting in part is attributed to attrition of the rough surface of granular carbon particles that takes place during the handling of such carbon products.

It has now been discovered, in accordance with the present invention, that granular carbons characterized by higher density, relatively smooth edges and surfaces and being less dusty, which do not present the problems of the prior art products, may be produced by passing a fluid mixture of granular carbon through a series of looped pipes under pressure. In the present method, carbon particles being conveyed through a looped system of pipes under pressure are subject to attrition as a result of rubbing against the walls of the pipes and against one another.

In a preferred embodiment of the present method a granular carbon such as activated carbon is propelled from a holding tank under pressure in mixture with a gas and passed through a series of looped pipes at a velocity from about 2500 ft./min. to about 7500 ft./min. Any suitable gas can be used in the present process, for example, carbon dioxide, air or nitrogen. The diameter of the looped pipes through which the carbon-gas mixture is propelled and the velocity of the carbon-gas mixture through such pipes should be correlated so that a pressure drop from about one inch to about two inches of mercury is obtained as a result of its passage through the series of looped pipes. Therefore, the diameter of the pipes used to fabricate the present series of looped pipes used in the present method may be varied greatly so long as the granular carbon-mixture can be conveyed therein at linear flow rates from about 2500 ft./min. to 7500 ft./min. and undergo a pressure drop from about one to about two inches of mercury as a result of passing through such looped pipes.

The method of the present invention may be made more readily understood by reference to the attached schematic drawing showing apparatus to which the present method relates.

The charge tank 11 is partially filled with activated carbon through top port 13. The port 13 is closed and the air flow through pipe 23 from an air compresser is adjusted so that a pressure drop of about five inches of water is obtained across an orifice contained in pipe line 23 as indicated on manometer 24. Air is then introduced into tank 11 through valve 17 and pipe 21. The air pressure within tank 11 is maintained between about 12 to 15 p.s.i. as indicated by gauge 19 by means of pressure regulator 18 located in pipe line 21.

Slide valve 22 on the bottom of tank 11 is then opened whereby the carbon in tank 11 under air pressure is caused to flow through pipe 26 and then into pressurized pipe 23 and through looped pipe system 25 where it is attrited. After passing through looped pipe system 25 the carbon is conveyed through pipe 33 to cyclone 35 from which the carbon is then screened and bagged. Conduit 37 attached to the top portion of cyclone 35 is connected to a dust collector which collects the fines coming from pipe 33.

The looped pipe system 25 is comprised of two 90° loops designated as 27 and 29 at the beginning and end of the looped system and five 180° angles or bends designated as 2, 4, 6, 8 and 10. The pipe used to fabricate looped system 25 and pipes 22 and 23 had a diameter of 1½ inches.

What is claimed is:
1. A method for attrition of granular carbon particles which comprises, fluidizing granular carbon particles having very rough surfaces and jagged edges in a gaseous fluid with a velocity from about 2,500 ft./min. to about 7,500 ft./min., passing said fluid mixture through a series of looped pipes wherein a pressure drop of about one to about two inches of mercury results, and recovering processed carbon particles characterized by high density with relatively smooth edges and surfaces.

2. The method of claim 1 wherein said looped pipes comprise two 90° loops disposed one at the beginning and one at the end of the looped pipes with about 5 curved intermediate pipe portions each having a curvature of about 180°.

3. The method of claim 2 wherein the looped pipes have a diameter of 1½ inches.

4. The method of claim 1 wherein said carbon is activated carbon.

(References on following page)

References Cited

UNITED STATES PATENTS

| | | | |
|---|---|---|---|
| 2,155,697 | 4/1939 | Young | 241—39 |
| 2,257,907 | 10/1941 | Griswold | 241—5 X |
| 2,315,084 | 3/1943 | Chesler | 241—39 |
| 2,735,624 | 2/1956 | Beck | 241—39 X |
| 2,735,787 | 2/1956 | Eastman et al. | 241—39 X |
| 2,763,434 | 9/1956 | Strasser | 241—5 |
| 3,252,663 | 5/1966 | Kidwell | 241—39 |

ANDREW R. JUHASZ, *Primary Examiner.*

FRANK T. YOST, *Assistant Examiner.*

U.S. Cl. X.R.

241—39